United States Patent
Ohba et al.

(10) Patent No.: US 9,542,755 B2
(45) Date of Patent: Jan. 10, 2017

(54) IMAGE PROCESSOR AND IMAGE PROCESSING METHOD

(71) Applicant: Sony Computer Entertainment Inc., Tokyo (JP)

(72) Inventors: Akio Ohba, Kanagawa (JP); Hiroyuki Segawa, Kanagawa (JP); Tetsugo Inada, Kanagawa (JP); Hirofumi Okamoto, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/435,278

(22) PCT Filed: Jul. 18, 2013

(86) PCT No.: PCT/JP2013/004389
§ 371 (c)(1),
(2) Date: Apr. 13, 2015

(87) PCT Pub. No.: WO2014/064870
PCT Pub. Date: May 1, 2014

(65) Prior Publication Data
US 2015/0287215 A1  Oct. 8, 2015

(30) Foreign Application Priority Data
Oct. 22, 2012 (JP) ................. 2012-233089

(51) Int. Cl.
G06T 7/00 (2006.01)
G06T 7/20 (2006.01)
(Continued)

(52) U.S. Cl.
CPC ......... G06T 7/2093 (2013.01); G06K 9/00228 (2013.01); G06T 7/0044 (2013.01);
(Continued)

(58) Field of Classification Search
None
See application file for complete search history.

(56) References Cited

U.S. PATENT DOCUMENTS

| 7,978,907 B2 | 7/2011 | Fukui |
| 8,223,218 B2 | 7/2012 | Inoue |

(Continued)

FOREIGN PATENT DOCUMENTS

| JP | 2001143075 A | * | 5/2001 |
| JP | 2006046960 A | * | 2/2006 |

(Continued)

OTHER PUBLICATIONS

Lu Xia, Chia-Chih Chen, and J.K. Aggawal, Human detection using depth information by Kinect, Computer Vision and Pattern Recognition Workshops (CVPRW), 2011 IEEE Computer Society Conference (Jan. 2011), pp. 15-22.

(Continued)

*Primary Examiner* — Vu Le
*Assistant Examiner* — Delomia L Gilliard
(74) *Attorney, Agent, or Firm* — Matthew B. Dernier, Esq.

(57) ABSTRACT

An image acquisition section of an information processor acquires stereo images from an imaging device. An input information acquisition section acquires an instruction input from a user. A depth image acquisition portion of a position information generation section generates a depth image representing a position distribution of subjects existing in the field of view of the imaging device in the depth direction using stereo images. A matching portion adjusts the size of a reference template image in accordance with the position of each of the subjects in the depth direction represented by the depth image first, then performs template matching on the depth image, thus identifying the position of a target having a given shape and size in the three-dimensional space. An output information generation section generates output information by performing necessary processes based on the target position.

10 Claims, 12 Drawing Sheets

(51) Int. Cl.
*G06K 9/00* (2006.01)
*H04N 13/00* (2006.01)
*H04N 13/02* (2006.01)

(52) U.S. Cl.
CPC ....... *G06T 7/0075* (2013.01); *H04N 13/0022* (2013.01); *H04N 13/0239* (2013.01); *G06T 2207/10012* (2013.01); *G06T 2207/30196* (2013.01); *H04N 2013/0081* (2013.01)

(56) References Cited

U.S. PATENT DOCUMENTS

| | | | |
|---|---|---|---|
| 2007/0092134 A1 | 4/2007 | Fukui | |
| 2007/0122036 A1* | 5/2007 | Kaneda | G06K 9/00281 382/190 |
| 2011/0228117 A1* | 9/2011 | Inoue | G06K 9/00228 348/222.1 |
| 2014/0002604 A1* | 1/2014 | Ohba | H04N 13/0007 348/43 |

FOREIGN PATENT DOCUMENTS

| | | |
|---|---|---|
| JP | 2007087346 A | 4/2007 |
| JP | 2007122218 A * | 5/2007 |
| JP | 2007280088 A * | 10/2007 |
| JP | 2009294733 A * | 12/2009 |
| WO | 2007050885 A2 | 5/2007 |
| WO | 2010064405 A1 | 6/2010 |
| WO | 2012132168 A1 | 10/2012 |

OTHER PUBLICATIONS

International Search Report for corresponding PCT Application No. PCT/JP2013/004389, dated Sep. 17, 2013.
International Preliminary Report on Patentability and Written Opinion for corresponding application PCT/JP2013/004389, 9 pages, dated May 7, 2015.

* cited by examiner

IMAGE PROCESSOR AND IMAGE PROCESSING METHOD

TECHNICAL FIELD

The present invention relates to an image processor that performs processes based on a shot image and an image processing method used by the image processor.

BACKGROUND ART

In recent years, it has become common practice that a camera is incorporated in a personal computer or game console for capturing images of a user for use in a variety of forms. For example, some technologies that are commercially available today such as TV phone and video chat are designed to transmit user's images to other end in an as-is manner via a network. Other technologies recognize user's motions by image analysis and use such motions as input information for games and information processing (refer, for example, to PTL 1 and NPL 1). Further, it has become possible in recent years to provide a game which is better sense of realism and image representation by detecting object's motions in a three-dimensional space including the depth direction with high accuracy.

CITATION LIST

Patent Literature

[PTL 1]
WO 2007/050885 A2 Publication

Non Patent Literature

[NPL 1]
Lu Xia, Chia-Chih Chen, and J. K. Aggawal, Human detection using depth information by Kinect, Computer Vision and Pattern Recognition Workshops (CVPRW), 2011 IEEE Computer Society Conference (2011), pp. 15-22

SUMMARY

Technical Problem

There are a variety of problems in shooting a space in which numerous objects exist and identifying only a desired target from an image thereof or tracking its motion. For example, there is a likelihood that processing results may be affected by the change in shooting environment such as light source. The detection process of a target at higher temporal and spatial resolutions for higher accuracy leads to higher processing load. As a result, it takes time from the shooting of a subject to the output of processing result, resulting in poor response to the subject's motion.

The present invention has been devised in light of the foregoing, and it is an object of the present invention to provide a technology for efficient position detection of a target in a three-dimensional space.

Solution to Problem

One mode of the present invention relates to an image processor. The image processor detects a positon of a given target of a subject shot with a camera and includes a depth image acquisition portion and a matching portion. The depth image acquisition portion acquires a depth image representing, on an image plane, a distance of the subject from the camera in a depth direction as a pixel value. The matching portion adjusts a size of a template image prepared for the target in accordance with a position of the template image and the distance of the subject represented by the depth image in the depth direction. Then, the matching portion evaluates the matching of the picture of the subject based on the pixel value within an area corresponding to the template image on the depth image or the image shot with the camera. The matching portion identifies the picture of the subject, the target, based on the matching evaluation result, generates position information thereof, and outputs that information.

Another mode of the present invention relates to an image processing method for an image processor to detect a positon of a given target of a subject shot with a camera. The image processing method includes a step of acquiring a depth image representing, on an image plane, a distance of the subject from a camera in a depth direction as a pixel value. The image processing method further includes a step of reading data of a template image prepared for the target from a memory. The image processing method further includes a step of adjusting a size of the template image in accordance with a position of the template image and the distance of the subject represented by the depth image in the depth direction, and then evaluating the matching of the picture of the subject based on the pixel value within an area corresponding to the template image on the depth image or the image shot with the camera. The image processing method still further includes a step of identifying the picture of the subject, the target, based on the matching evaluation result, generating position information thereof, and outputting that information.

It should be noted that any combinations of the above components and any conversions of expressions of the present invention between "method," "device," "system," "computer program," "recording media storing a computer program," and so on are also effective as modes of the present invention.

Advantageous Effect of Invention

The present invention achieves excellent response in information processing using a shot image as input information.

DESCRIPTION OF EMBODIMENT

Figure 1:
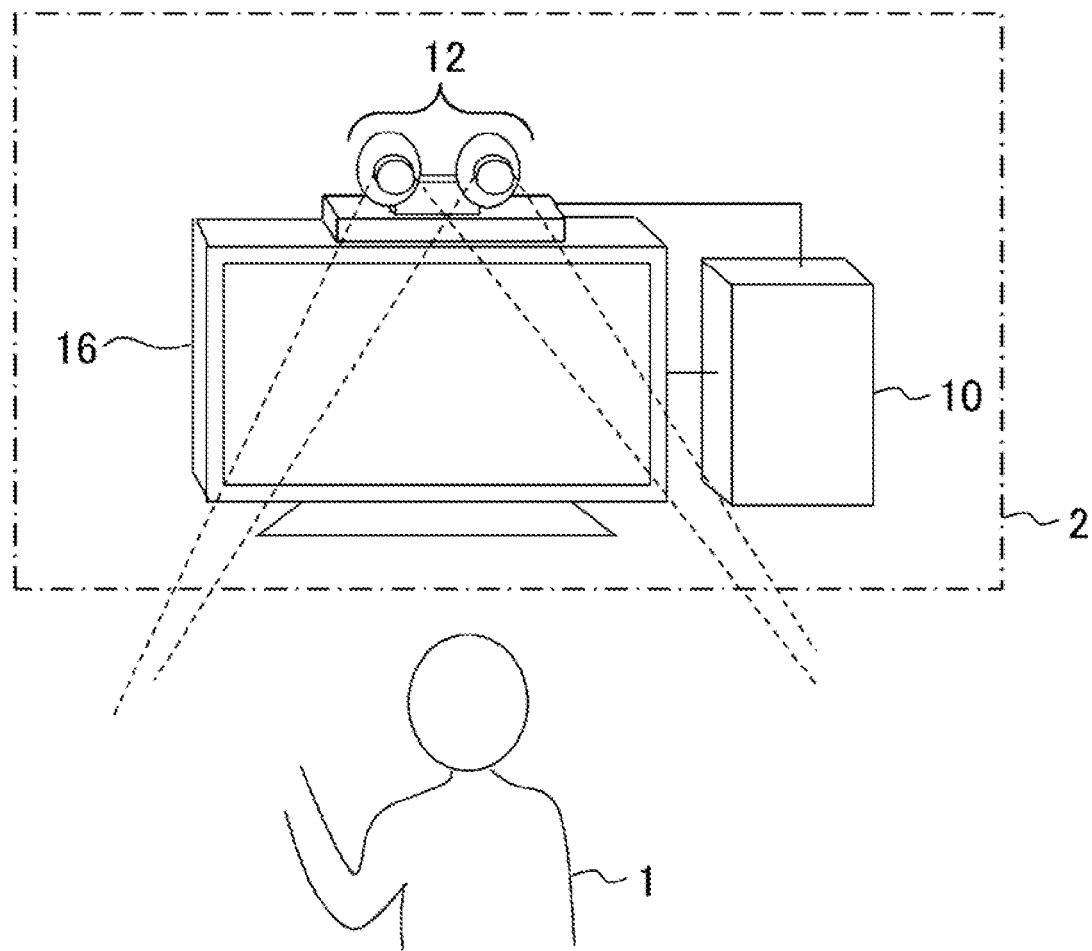
FIG. 1 is a diagram illustrating a configuration example of an information processing system to which the present embodiment is applicable.

FIG. 1 illustrates a configuration example of an information processing system to which the present embodiment is applicable. An information processing system 2 includes an imaging device 12, an information processor 10, and a display device 16. The imaging device 12 includes two cameras adapted to capture a target such as a user 1. The information processor 10 handles information processing in response to a request of the user based on the shot image. The display device 16 outputs image data obtained as a result of the processes performed by the information processor 10. The information processor 10 may connect to a network such as the Internet.

The information processor 10, the imaging device 12, and the display device 16 may be connected together by cables. Alternatively, they may be connected together wirelessly, for example, through wireless LAN (Local Area Network). Any two of the imaging device 12, the information processor 10, and the display device 16, or all thereof may be combined integrally. Alternatively, the imaging device 12 need not necessarily be disposed on top of the display device 16. Further, there are no limitations to the number and types of subjects.

The imaging device 12 has two digital video cameras that are arranged, one on the left and another on the right with a known space therebetween. Each of the digital video cameras includes a CCD (Charge Coupled Device), CMOS (Complementary Metal Oxide Semiconductor), or other imaging element. Each of the digital video cameras captures a subject existing in the same space from the right or left position at a given frame rate. A frame pair obtained by shooting as described above will be hereinafter referred to as "stereo images."

The information processor 10 detects the position of a target in a three-dimensional space including the image plane and the position in the depth direction from the cameras. Here, the term "target" refers to an object of a desired shape and size of the subject in the field of view of the imaging device 12. That is, in the present embodiment, if conditions related to shape and size are specified, the object matching those conditions is identified in the subject, thus generating information related to its position as a detection result.

The detection result is used for the processes performed at subsequent stages where the target's position and motion are used as input information. For example, the head position of the user 1, a target, is detected so that a face recognition process is performed on the head area at a subsequent stage to recognize a person or identify his or her facial expression. Alternatively, tracking may be performed based on the detected positon of the head or other area, thus recognizing a gesture, reflecting the position into the game image, converting the position into a command input for information processing, and so on. Thus, the application purpose of information related to target position obtained in the present embodiment is not specifically limited.

The display device 16 displays the result of the process performed by the information processor 10 as an image as necessary. The display device 16 may be a display adapted to output an image or a television set having a speaker adapted to output sounds. The display device 16 may be, for example, a liquid crystal television, plasma television, PC display, and so on. The details of processes eventually performed by the information processor 10 and the image to be displayed are not specifically limited by the application purpose thereof as described above. Therefore, a description will be given below with primary emphasis on position detection of a target handled by the information processor 10.

Figure 2:
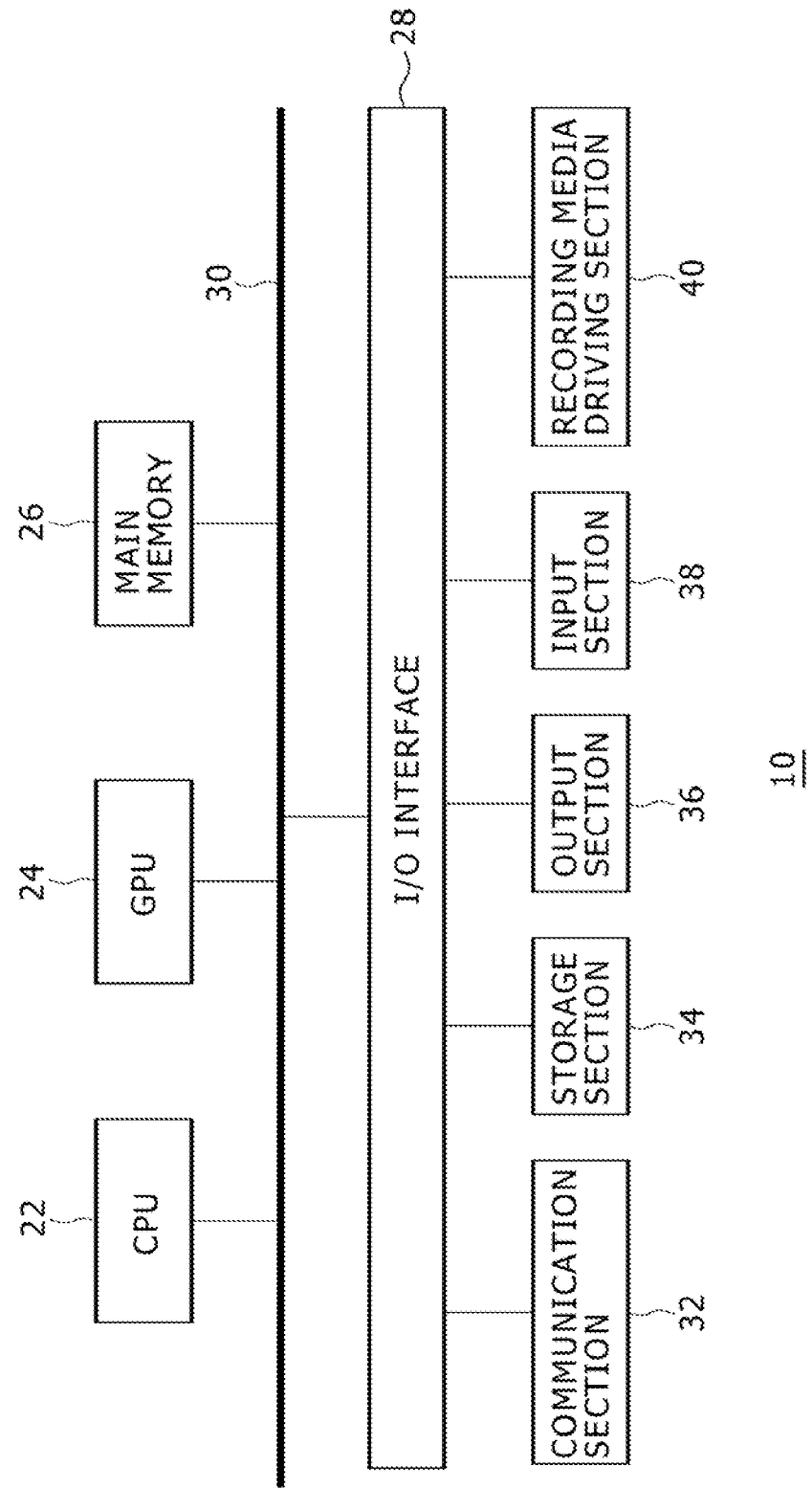
FIG. 2 is a diagram illustrating an internal circuit configuration of an information processor in the present embodiment.

FIG. 2 illustrates an internal circuit configuration of the information processor 10. The information processor 10 includes a CPU (Central Processing Unit) 22, a GPU (Graphics Processing Unit) 24, and a main memory 26. The CPU 22 performs processes associated with the internal components of the information processor 10 and controls the exchange of signals based on programs such as the operating system and application programs. The GPU 24 handles image processing. The main memory 26 includes a RAM (Random Access Memory) and stores programs and data required for processing.

These sections are connected to each other via a bus 30. An I/O interface 28 is also connected to the bus 30. A communication section 32, a storage section 34, an output section 36, an input section 38, and a recording media driving section 40 are connected to the I/O interface 28. The communication section 32 includes a peripheral interface such as USB and IEEE1394 and wired or wireless LAN network interface. The storage section 34 includes a hard disk drive, a nonvolatile memory, and so on. The output section 36 outputs data to output devices such as the display device 16 and the speaker. The input section 38 receives data inputs from input devices such as keyboard, microphone, and the imaging device 12. The recording media driving section 40 drives a removable recording media such as magnetic disk, optical disc, or semiconductor memory.

The CPU 22 controls the information processor 10 by executing the operating system stored in the storage section 34. The CPU 22 also executes various programs that are either read from the removable recording media and loaded into the main memory 26 or downloaded via the communication section 32.

The GPU 24 has a geometry engine function and a rendering processor function, performing drawing in accordance with a drawing instruction from the CPU 22, and storing a display image in a frame buffer which is not shown. Then, the display image stored in the frame buffer is converted into a video signal and output, for example, to the output section 36.

Figure 3:
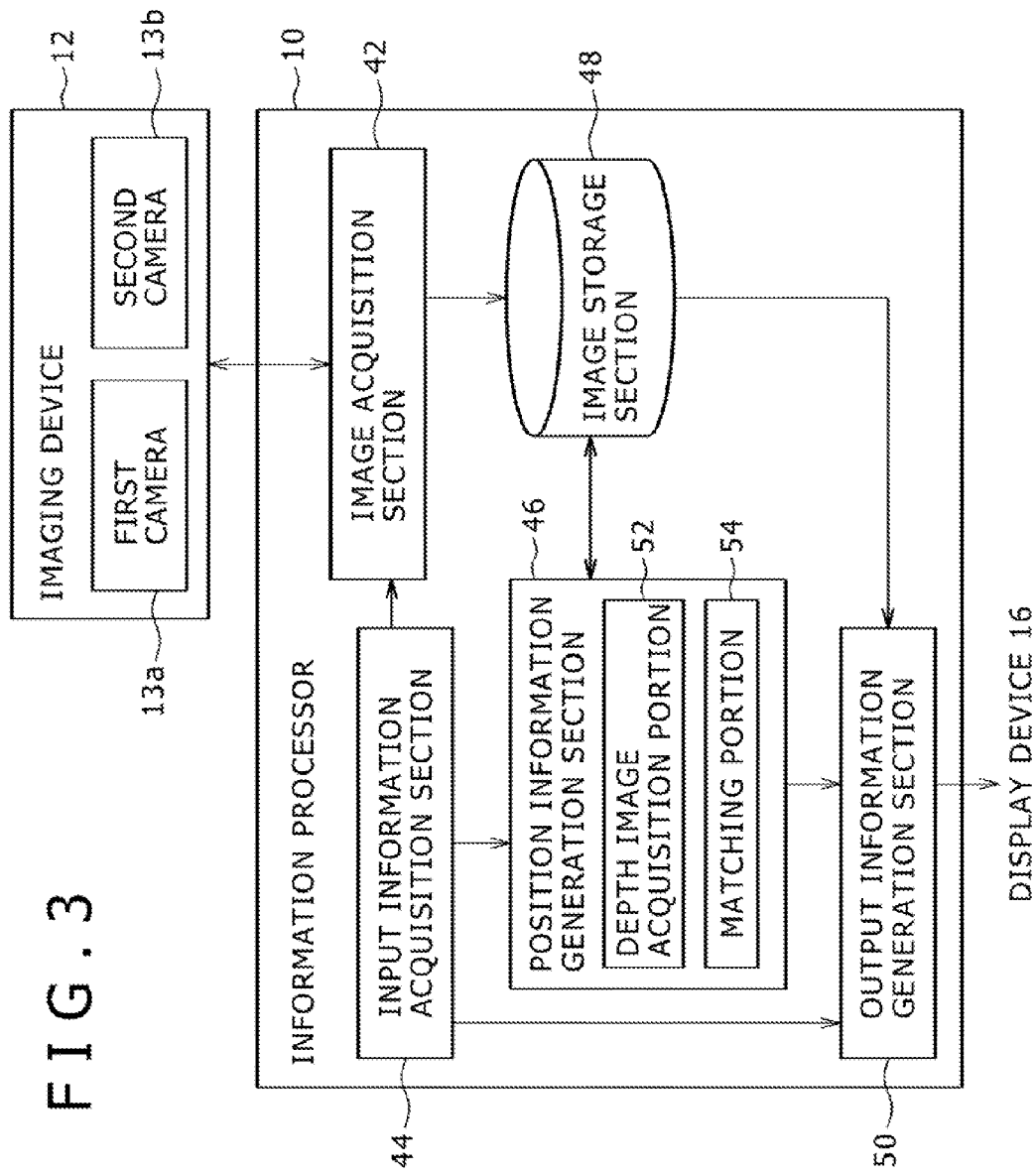
FIG. 3 is a diagram illustrating configurations of an imaging device and the information processor in the present embodiment.

FIG. 3 illustrates configurations of the imaging device 12 and the information processor 10. Each of the functional blocks illustrated in FIG. 3 can be implemented in terms of hardware by the CPU, the GPU, the RAM illustrated in FIG. 2, and other processors and in terms of software by programs offering data input, data retention, image analysis, drawing and other functions. Therefore, it will be understood by those skilled in the art that these functional blocks can be implemented in various forms including hardware alone, software alone, and a combination thereof, and are not limited to any one of them.

The imaging device 12 includes first and second cameras 13a and 13b. Each of the cameras captures a subject from the left or right position at a given frame rate. The left and right positions are spaced by a known width. The stereo images obtained by shooting are transmitted to the information processor 10 whenever necessary by an ordinary technique in response to a request from the information processor 10.

The information processor 10 includes an image acquisition section 42, an input information acquisition section 44, a position information generation section 46, an output information generation section 50, and an image storage section 48. The image acquisition section 42 acquires stereo images from the imaging device 12. The input information acquisition section 44 acquires an instruction input from the user. The position information generation section 46 generates target position information based on shot images. The output information generation section 50 generates output information by performing necessary processes based on the target position. The image storage section 48 stores stereo images supplied from the imaging device 12 and intermediate data generated, for example, by the position information generation section 46.

The input information acquisition section 44 accepts an instruction input to start or terminate the process and an instruction input from the user by the means except shooting of the imaging device 12 and transmits an appropriate processing request signal to other functional blocks. The input information acquisition section 44 is implemented by coordination between an ordinary input device such as button, keyboard, mouse, trackball, or touch panel and the CPU adapted to interpret the details of operation performed on the input device and generate a processing request signal.

The image acquisition section 42 acquires image data such as stereo images from the imaging device 12 in response to a request from the input information acquisition section 44, storing the image data in the image storage section 48. Images to be acquired by the image acquisition section 42 may be various in type in accordance with the process performed by the output information generation section 50 at a subsequent stage or information to be output. For example, only an image shot with the first camera 13a may be acquired at the same frame rate as at the time of shooting, and stereo images shot by the cameras 13a and 13b at a lower rate may be acquired. That is, the frame rates at which an image shot by the first camera 13a and that shot by the second camera 13b are acquired may be specified independently of each other.

The position information generation section 46 detects the three-dimensional position of the target based on the stereo image data stored in the image storage section 48. The position information generation section 46 includes a depth image acquisition portion 52 and a matching portion 54. The depth image acquisition portion 52 generates a depth image representing a position distribution of subjects existing in the field of view of the imaging device 12 in the depth direction using stereo images. The position distribution of subjects in the depth direction can be found by an ordinary technology such as the stereo image method. Here, the stereo image method is an ordinary technique which associates feature points between stereo images to calculate the positions of the subjects in the depth direction from the parallax. On the other hand, the depth image is an image in which the distance of each subject from the imaging device 12 is mapped into two-dimensional coordinates of the image plane and represented as a pixel value.

Therefore, the depth image represents the positions of not only main subjects such as persons but also a variety of objects existing in the space to be shot such as chair and desk together with their shapes. It should be noted that the imaging device 12 may have a function to generate a depth image. In this case, the image acquisition section 42 acquires depth image data from the imaging device 12 and stores it in the image storage section 48. Then, the depth image acquisition portion 52 reads the data. In any case, the depth image acquisition portion 52 supplies the generated or acquired depth image to the matching portion 54.

The matching portion 54 performs template matching on the depth image, thus identifying the position of a target having a given shape and size in the three-dimensional space. Therefore, reference template image data for matching representing the shape and the size is prepared in advance and stored, for example, in a memory accessible by the matching portion 54.

If it is sufficient to detect the position of one kind of target such as head, only one reference template image may be prepared. Alternatively, a plurality of reference template images for a plurality of kinds of targets or a plurality of sizes may be prepared so as to switch between the targets or sizes in accordance with the process performed by the output information generation section 50 at a subsequent stage. For example, a target or size may be specified within the program executed by the information processor 10. Alternatively, a target or size may be selected by the user in accordance with the desired process.

The matching portion 54 adjusts the size of the reference template image in accordance with the position of each of the subjects in the depth direction represented by the depth image first, and then performs matching against the subject, thus calculating a matching evaluation value that represents the degree of match in shape. Then, the matching portion 54 detects the subject that provides a high matching evaluation value, thus determining whether or not the subject is the desired target and identifying its position in the three-dimensional space. This ensures that a subject having the same shape but not the same size is not detected, thus restricting the size and shape and allowing to detect the desired target. Further, the magnification factor of the reference template image is restricted for each subject, thus reducing the variations of conditions under which a matching evaluation value is to be calculated and reducing the processing load.

The output information generation section 50 performs further processes as appropriate according to the application purpose based on information relating to the target position supplied from the position information generation section 46. Among such processes is drawing on the shot image read from the image storage section 48. The process performed here is not specifically limited as described above and may be changed as appropriate in response to an instruction from the user accepted by the input information acquisition section 44. Image data obtained as a result of the process is displayed on the display device 16. Alternatively, image data may be transmitted to other device via a network.

Figure 4:
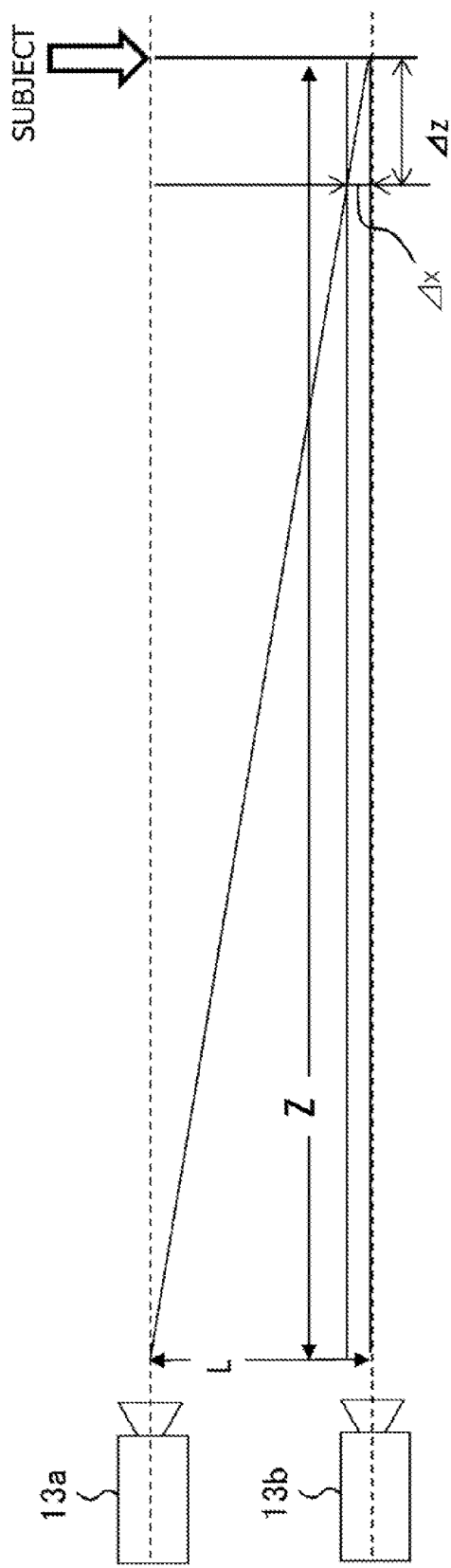
FIG. 4 is a diagram for describing the relationship between stereo image parallax and the position of a subject in the depth direction in the present embodiment.

A description will be given next of the relationship between the subject position in the depth direction and the template image size. We assume here that the same unit of length such as meters is used unless otherwise specified. FIG. 4 is a diagram for describing the relationship between stereo image parallax and the position of a subject in the depth direction. The first and second cameras 13a and 13b are disposed in such a manner as to have parallel optical axes that are at a distance L from each other. We assume that the subject is located at the position indicated by the arrow at the far right end from the stereo camera. This position is at a distance Z in the depth direction.

A width Δx in the real space represented by a pixel of the image shot by each of the cameras is proportional to the distance Z and expressed as follows:

$$\Delta x = Z \times w/W \qquad (1)$$

where W is the horizontal pixel count of the camera, w is the horizontal range of view field of the real space when the distance Z is 1 and is determined by the view angle.

The same subject captured by the cameras that are at the distance L from each other has approximately the following parallax D in pixels (pixels) in that image:

$$D = L/\Delta x = L \times (W/w) \times (1/Z) = C/Z \qquad (2)$$

where C is the value determined by the camera and its setting and can be considered a constant during operation. Assuming that parallax $D_{at1}$ (pixels) at the distance Z of 1 is known, the distance Z in the depth direction for the arbitrary parallax D (pixels) is found as follows:

$$Z = D_{at1}/D \qquad (3)$$

On the other hand, assuming that the reference template image read by the matching portion 54 represents the target in a width $p_{tmp}$ (pixels) in pixels, a width p (pixels) of the target in pixels at the arbitrary distance Z is inversely proportional to the distance Z in the depth direction as is the parallax D (pixels) and expressed as follows:

$$p = p_{tmp} \times (Z_{tmp}/Z) \qquad (4)$$

where $Z_{tmp}$ is the distance of a target in the depth direction when the target is represented in the size matching the reference template in the shot image.

Letting the width represented by one pixel of the reference template in the real space be denoted by $\Delta x_{tmp}$ and letting the width represented by one pixel of the image shot with a camera in the real space at the distance Z of 1 be denoted by $\Delta x_{at1}$, then the following holds from formula (1):

$$\Delta x_{tmp} = Z_{tmp} \times w/W \qquad (5)$$

$$\Delta x_{at1} = w/W \qquad (6)$$

Hence, the following formula is obtained:

$$Z_{tmp} = \Delta x_{tmp}/\Delta x_{at1} \qquad (7)$$

Therefore, formula (4) changes to the following:

$$p = p_{tmp} \times \Delta x_{tmp}/\Delta x_{at1}/Z \qquad (8)$$

As a result, a magnification factor M by which the reference template image is to be multiplied to fit the reference template image to the size of the subject in the image at the arbitrary distance Z is found as follows:

$$M = \Delta x_{tmp}/\Delta x_{at1}/Z \qquad (9)$$

$\Delta x_{at1}$ is a fixed value which depends, for example, on the camera. Therefore, the size can be adjusted by determining $\Delta x_{tmp}$ in accordance with the reference template image to be prepared. For example, if the position of a human head is identified, and if a reference template image is prepared which assumes the head to be 0.2 m wide or so and represents the actual width of 0.3 m including a margin area as 16 pixels in width, $\Delta x_{tmp} = 0.3/16 = 0.019$ m. It should be noted that, in the present embodiment, matching is performed between a depth image and a size-adjusted template image as described above. Therefore, if the image shot with a camera and the depth image differ in resolution, the width of the real space represented by one pixel of the depth image is assumed to be $\Delta x_{at1}$.

Figure 5:
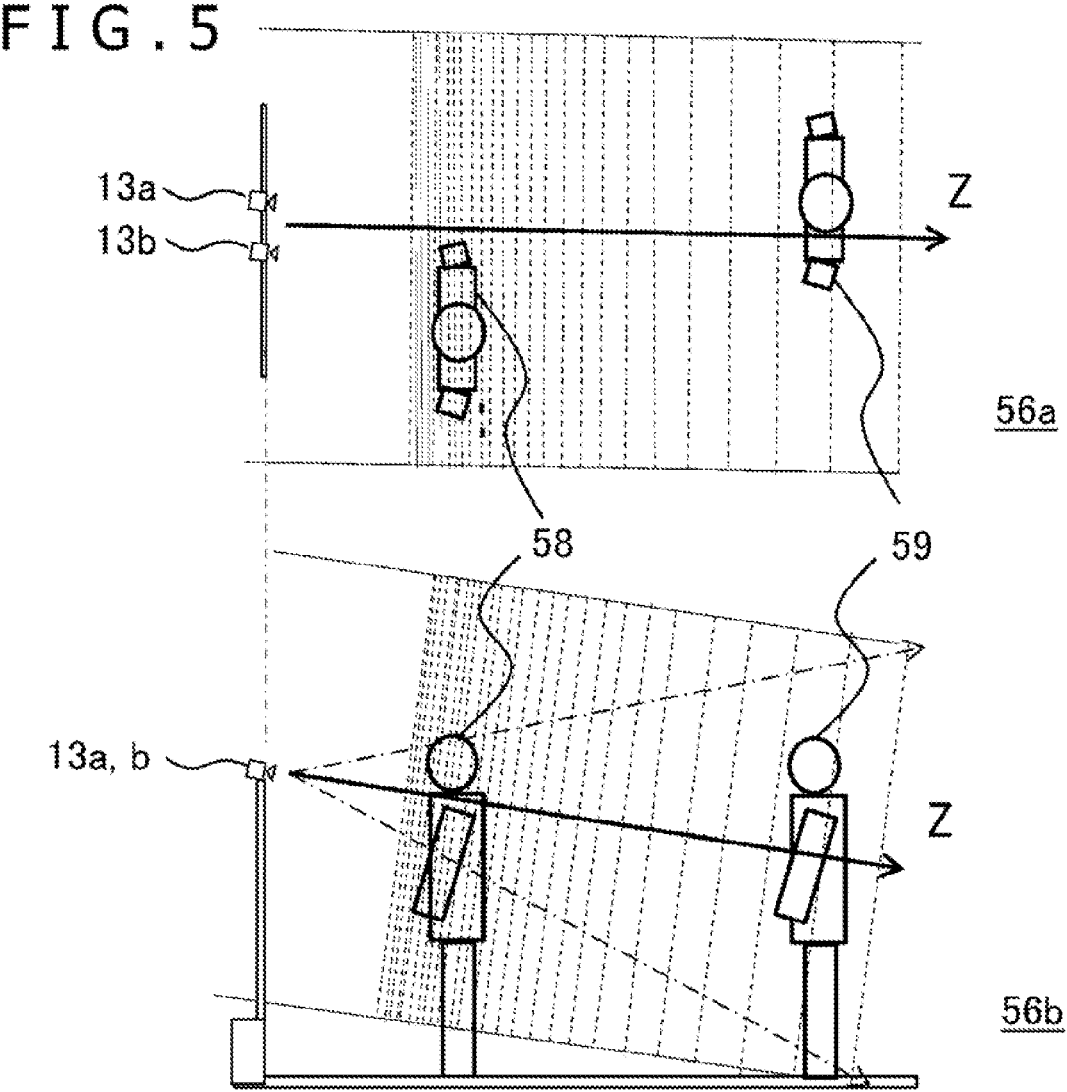
FIG. 5 is a diagram for describing axes in the depth direction in a shooting space in the present embodiment.

FIG. 5 is a diagram for describing axes in the depth direction in a shooting space. The figure at the top is a schematic diagram 56a as seen from top of the shooting space. The figure at the bottom is a schematic diagram 56b as seen from side of the shooting space. Persons 58 and 59, subjects, are in the fields of view of the first and second cameras 13a and 13b.

It should be noted that the optical axes of the first and second cameras 13a and 13b are parallel with no vertical displacement between them as shown in FIG. 4. There is actually vertical displacement between them in some cases. However, we assume that an image shot in such an environment is corrected to a condition free from displacement by an ordinary technique. In FIG. 5, dotted lines represent equal parallax planes. Here, the term "equal parallax plane" refers to a plane on which the parallax is the same on all points of the plane, and by extension, to a plane on which the distance Z from the cameras is equally calculated by formula (2). Therefore, the distance Z in the depth direction is defined by the distance from the imaging planes (sensor planes) of the cameras on the axis (optical axes) vertical to the equal parallax planes as shown in FIG. 5.

Figure 6:
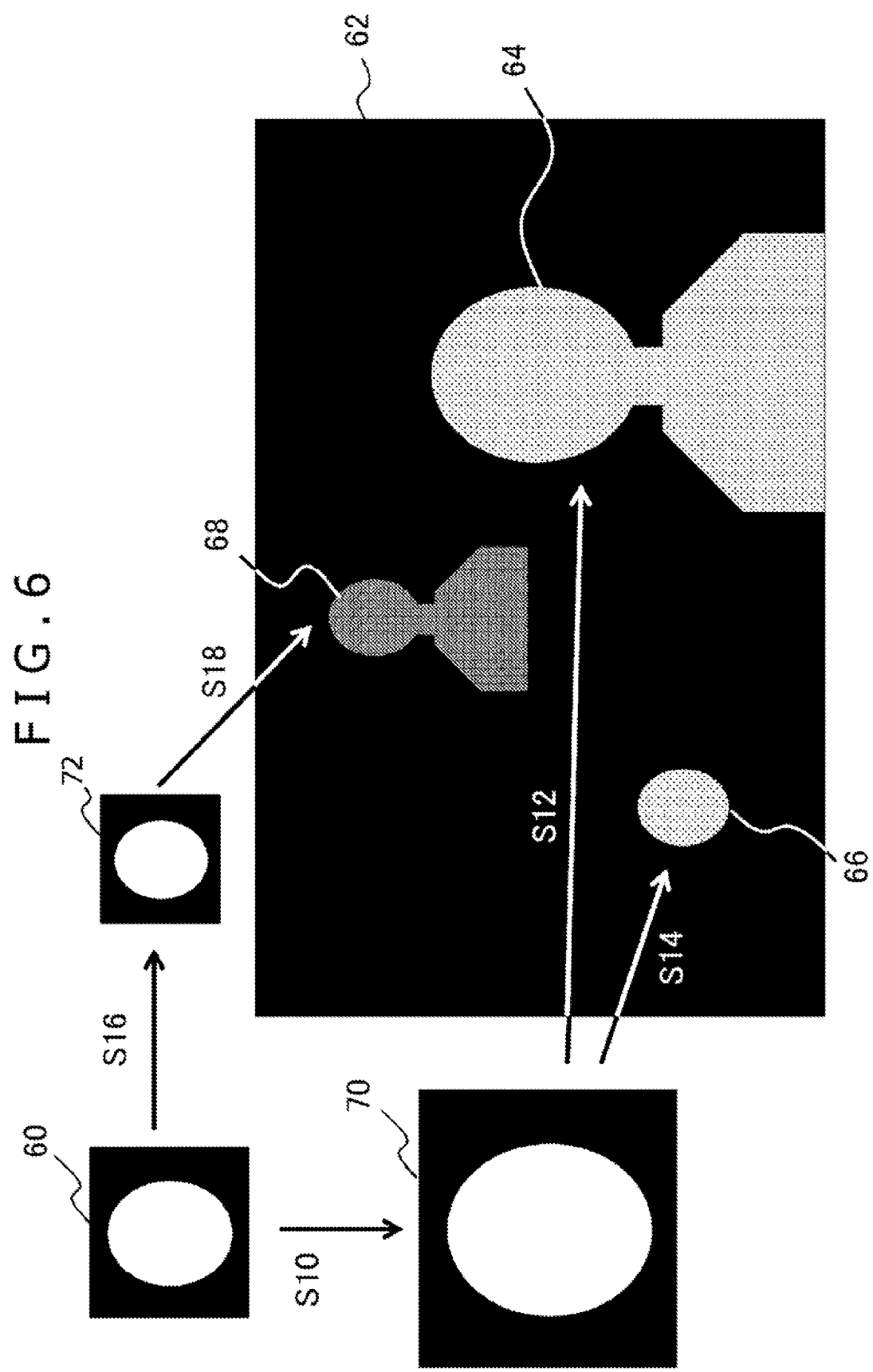
FIG. 6 is a diagram schematically illustrating the steps of a template matching process handled by a matching portion in the present embodiment.

FIG. 6 schematically illustrates the steps of a template matching process handled by the matching portion 54. First, a reference template image 60 is prepared in advance which defines the shape and size of the target as described earlier. In the example shown in FIG. 6, a human head is a target. Therefore, the reference template image 60 represents a vertically long ellipse. Further, the reference template image 60 is a binary image whose elliptical area representing the shape of the target is white (pixel value of 1), and whose area other than that is black (pixel value of 0). A description will be given hereinafter by adhering to this data format. However, the data format of a reference template image is not limited thereto.

On the other hand, the depth image acquisition portion 52 generates a depth image 62 based on stereo images obtained from the imaging device 12 at different times. Alternatively, the depth image acquisition portion 52 acquires the depth image 62 directly from the imaging device 12. The depth image 62 shows that the larger the pixel value, the smaller the distance Z in the depth direction, in other words, the cameras are close. However, the main point is not that the data format of the depth image is limited thereto. When the depth image 62 is displayed as an image, the closer a subject is from the cameras, the more luminous it becomes.

In FIG. 6, the difference in image display luminance is represented by ensuring that the larger the pixel value, the lower the density of shading. That is, the depth image 62 contains three subjects 64, 66, and 68 in the field of view. The subjects 64 and 66 are located at similar distances relatively close to the cameras. The subject 68 is located farther from the cameras. Here, the positional relationship between the subjects 64 and 68 corresponds to that between the persons 58 and 60 in FIG. 5.

The matching portion 54 finds the magnification factor M from formula (9) in accordance with the distance Z of each of the subjects 64, 66, and 68 in the depth direction, thus enlarging or reducing the reference template image 60. It should be noted, however, that the reference template image 60 is not enlarged or reduced when the magnification factor M is 1. For example, if a distance $Z_{64}$ of the subject 64 is approximately equal to a distance $Z_{66}$ of the subject 66

($Z_{64} \approx Z_{66}$), and if magnification factors $M_{64}$ and $M_{66}$ calculated therefrom that are approximately equal ($M_{64} \approx M_{66}$) are larger than 1, the reference template image 60 is enlarged by that magnification factor (S10). Then, template matching is performed on the subjects 64 and 66 at that distance using an enlarged template image 70 (S12 and S14).

On the other hand, if the magnification factor $M_{68}$ calculated from a distance $Z_{68}$ of the subject 68 is smaller than 1, the reference template image 60 is reduced by that magnification factor (S16). Then, template matching is performed against the subject 68 at the distance $Z_{68}$ using a reduced template image 72 (S18).

The template matching process is performed as follows. That is, the process of arranging the template image in the depth image and calculating the matching evaluation value is repeated while moving the template image only very slightly at a time. This process is repeated for each subject, thus identifying, as a target, the subject that provides an excellent matching evaluation value equal to or larger than a threshold at one of the positions and determining the position of the template image as the target position. An ordinary technique can be used to calculate a matching evaluation value at each template image position. For example, indices representing the differences in pixel value between the two images may be summed within the template image area and used as a matching evaluation value.

In the present embodiment, the area of the subject picture at the distance Z in the depth direction is uniquely associated with the template image used for the subject. As a result, the area over which the template image is moved is more limited than when template matching is performed over the entire surface of the shot image. Further, there is no need to repeatedly change the size of the template image and calculate a matching evaluation value at each template image position. In the example shown in FIG. 6, the subjects 64 and 66 are objects in the same shape but at different sizes. However, matching using the enlarged template image 70 makes it possible to find, from the matching evaluation value, that the subject 64 is the only desired target. As a result, it is possible to efficiently detect the position of the target of the desired shape and size.

Figure 7:
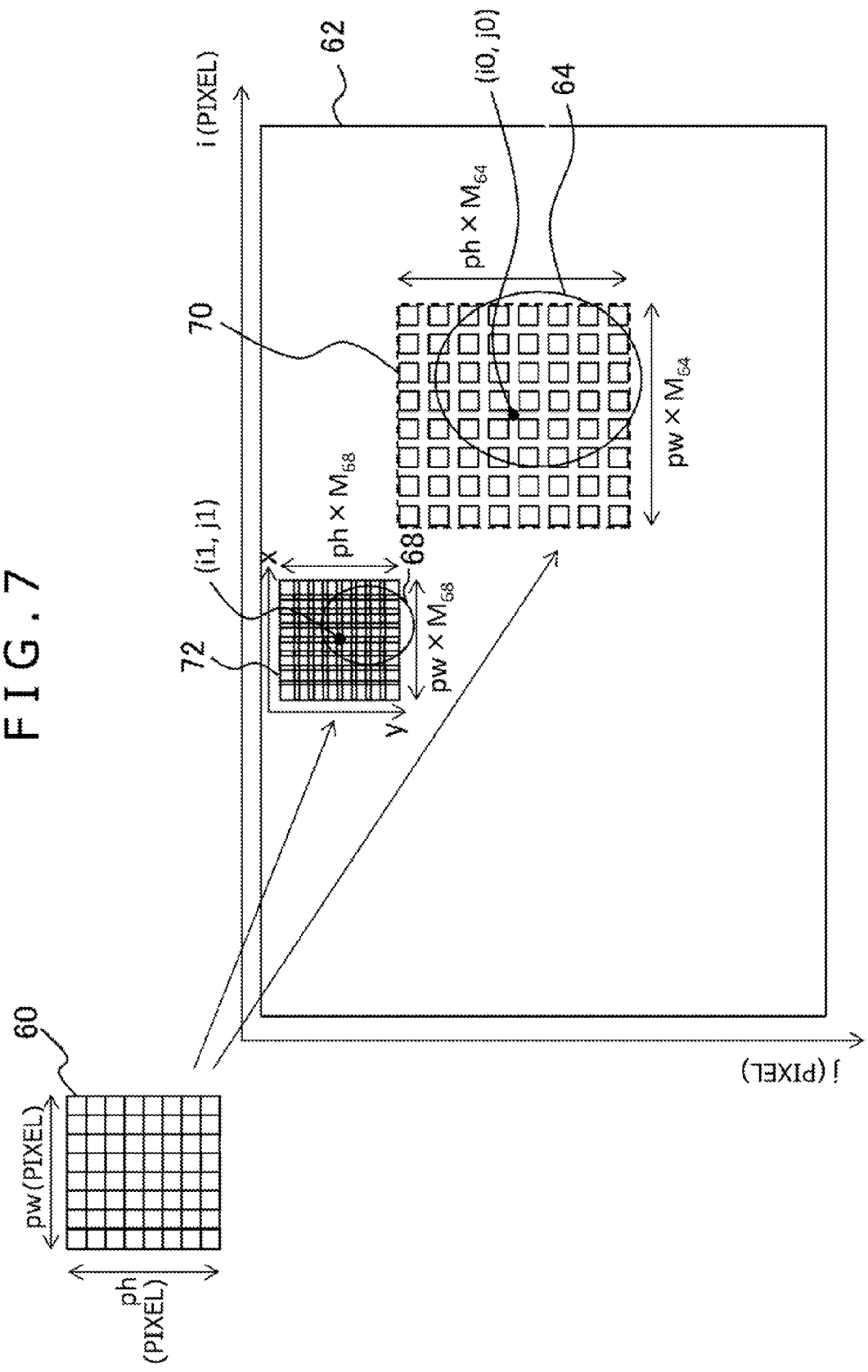
FIG. 7 is a diagram for describing a specific technique for adjusting the size of a reference template image first and then calculating a matching evaluation value in the present embodiment.

FIG. 7 is a diagram for describing a specific technique for adjusting the size of a reference template image first and then calculating a matching evaluation value. The reference template image 60, the size-adjusted template images 70 and 72, and the depth image 62 are similar to those shown in FIG. 6. Therefore, these images are denoted by the same reference symbols. It should be noted, however, that the reference template image 60 in FIG. 7 is divided into cells of a lattice, with each cell representing one pixel. As for the depth image 62, on the other hand, only the contours of the heads of the subjects 64 and 68 are shown by solid lines for ease of comprehension.

A horizontal pixel count pw (pixels) and a vertical pixel count ph (pixels) of the reference template image 60 are both 8 (pw=ph=8) in FIG. 7. However, the main point is not that the pixel counts are limited thereto. The matching portion 54 scans the pixels of the depth image 62, for example, in raster order, thus detecting the pixels whose values fall within a given range. Here, the term "given range" refers to a range in which the pixel value is considered valid as a distance in the depth direction. The upper and lower limits thereof are set in advance. The range may be changed according to the application purpose of information such as games.

In FIG. 7, one of the pixels detected as described above is represented by pixel coordinates (i1, J1). This pixel is included in the picture area of the subject 68. When such a pixel is detected, the template image 72 is arranged so that that pixel is located at the center of the template image 72. It should be noted, however, that the reference template image 60 is reduced by the magnification factor $M_{68}$ ($M_{68}$<1) appropriate to the pixel value of this pixel, i.e., the distance $Z_{68}$ in the depth direction. Therefore, the horizontal width of the template image 72 to be arranged is pw×$M_{68}$ (pixels) in pixels, and the vertical width thereof is ph×$M_{68}$ (pixels) in pixels.

Then, the pixel value of the template image 72 and that of the depth image 62 are compared at the same position. As illustrated in FIG. 7, the reference template image 60 is reduced relative to the subject 68. As a result, the gap between pixels in the template image 72 becomes smaller than that in the depth image 62. That is, the pixels to be compared may not be in a one-to-one correspondence. In this case, the pixel of the depth image 62 close to the pixel of the template image 72 is basically considered to be "at the same position." As a result, a plurality of pixels of the template image 72 may be compared with one pixel of the depth image 62.

Assuming that the coordinates of each of the pixels of the template image 72 are (x, y), the coordinates (i, j) of the pixel of the depth image 62 considered to be "at the same position" can be found, for example, as follows:

$$i=i1+(x-pw/2) \times M1 \quad (10)$$

$$j=j1+(y-ph/2) \times M1 \quad (11)$$

Here, the second term of the right side is changed to an integer by rounding off or dropping the fractional part.

The same is true for matching against the subject 64. That is, if coordinates (i0, j0) of one of the pixels detected by scanning falls within the picture area of the subject 64, the pixel value of this pixel is the distance $Z_{64}$ of the subject 64 in the depth direction. Therefore, the magnification factor $M_{64}$ ($M_{64}$>1) is calculated in accordance therewith. Then, the template image 70, obtained by enlarging the reference template image 60 by the magnification factor $M_{64}$, is arranged so that the pixel is located at the center of the template image 70. Here, the horizontal width of the template image 70 is pw×$M_{64}$ (pixels), and the vertical width thereof is ph×$M_{64}$ (pixels).

Then, the pixel value of the template image 70 and that of the depth image 62 are compared at the same position. In this case, the reference template image 60 has been enlarged. Therefore, the gap between pixels in the template image 70 is larger than that in the depth image 62. However, the pixel of the depth image 62 considered to be at the same position as each of the pixels of the template image 70 can be determined as with formulas (10) and (11).

Figure 8:
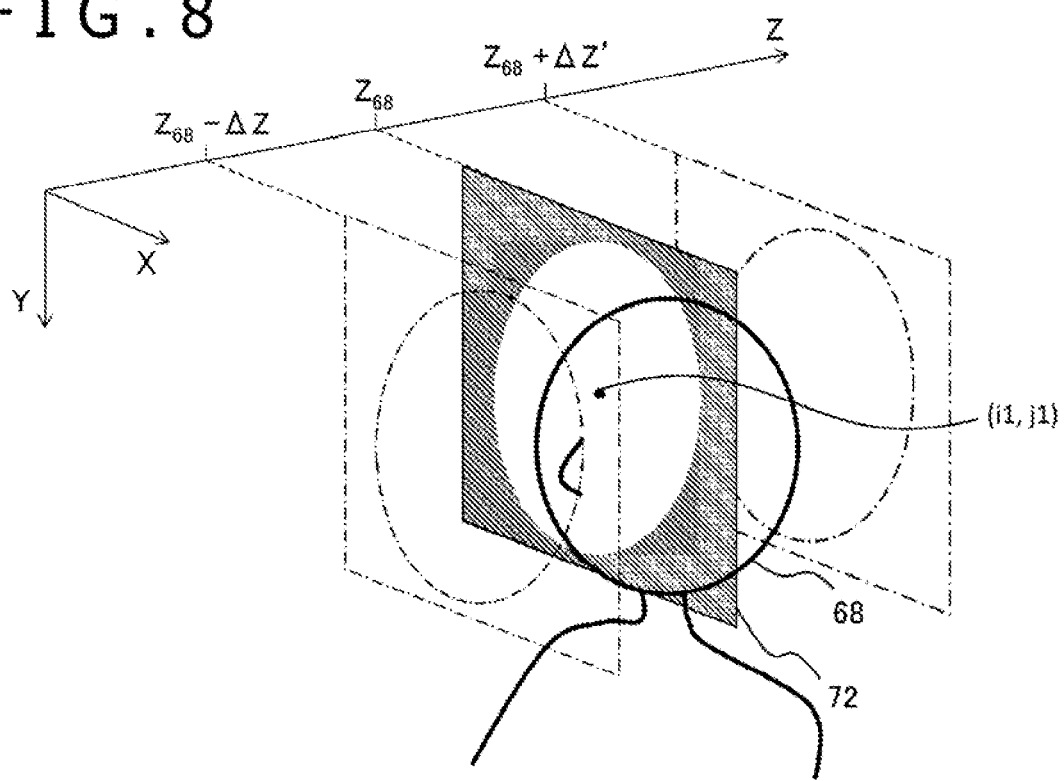
FIG. 8 is a diagram for describing a calculation method of the matching evaluation value in the present embodiment.

When the pixel of the template image is associated with that of the depth image as described above, a matching evaluation value is calculated using the pixel values of the two pixels. FIG. 8 is a diagram for describing a calculation method of a matching evaluation value in the present embodiment. FIG. 8 illustrates the positional relationship between the template image 72, shown in FIG. 7, and the actual subject 72 in the three-dimensional space. The template image 72 is arranged so that the coordinates (i1, j1) are located at the center of the template image 72. In evaluating the match, it is determined for each pixel whether or not the pixel value of the depth image, i.e., the distance Z in the depth direction, falls within the given range in the area inside the target represented by the template image.

The distance $Z_{68}$ in the depth direction, the pixel value at the coordinates (i1, j1), which was the reason why the template image 72 was arranged, represents the position of a point on the head surface of the subject 68. The head actually has a round three-dimensional shape. Therefore, the distance from the cameras to the head surface has a distribution in relation to the image plane (XY plane in FIG. 8). For this reason, the subject whose surface exists within the given range in the depth direction from the distance $Z_{68}$, the starting point, is highly likely to represent the same subject as that detected at the coordinates (i1, j1). Therefore, this subject is reflected in the matching evaluation value. FIG. 8 illustrates that the distance Z of the head surface in the depth direction is set to fall within the range $Z_{68}-\Delta Z \leq Z < Z_{68}+\Delta Z'$. The longitudinal widths $\Delta Z$ and $\Delta Z'$ may be the same or different. For example, in order to detect the head position, a target can be determined to be part of the continuous surface of the head so long as it falls within the range of about 10 to 30 cm at the front and back. A specific value is determined according to the actual shape of the target.

Then, a matching evaluation value V is calculated as follows:

$$V=\Sigma u_n \times B_n \quad (12)$$

where $\Sigma$ is the sum of all the pixels of the template image, and $u_n$ takes on the value of "+1" if the pixel value of the depth image associated with the nth pixel of the template image falls within the above setting range, and, if not, takes on the value of "−1," and $B_n$ is the pixel value of the nth pixel in the template image, and takes on the value of "1" if the pixel is located inside the shape of the target, and if not, takes on the value of "0."

Such a calculation method ensures that if the distance of an object in the depth direction falls within the given range, and by extension, if the object is integral, and the closer the object is in shape and size to the template image, the higher the evaluation value V at the template image position. This technique detects a desired subject using not only the shape of the target represented by the template image but also information about the inside of the area of the depth image corresponding to the shape, thus providing high detection accuracy and ensuring robustness to shape change. For example, if a subject having an indefinite shape such as hand is detected as will be described later, this technique minimizes adverse impact on detection results thanks to its small dependence on shape in matching evaluation.

It should be noted that this calculation method is merely an example and can be used in various ways according, for example, to the data format of each image. For example, the depth image acquisition portion 52 may use feature points extracted from stereo images to calculate a matching evaluation value so as to generate a depth image. That is, feature points such as eyes, nose, mouth, and ears are set in a template image in advance. Then, the feature points of the template image arranged based on the pixel value of the depth image and the feature points of one of the stereo images are associated with each other to calculate a matching evaluation value in the same manner as described above.

The correspondence between the template image and the stereo image is found in the same manner as that between the template image and the depth image. Face detection, face recognition, or other technique can be used for matching between feature points. Even if the target is other object such as hands, the feature points in the entire inner area of the target can be used for matching evaluation by extracting ordinary feature points corresponding to the template image by using such as a Sobel filter and actual feature points in the stereo images. Evaluation may be performed in a diverse manner by using evaluation based on feature points and evaluation based on the above position distribution on the surface in combination.

Figure 9:
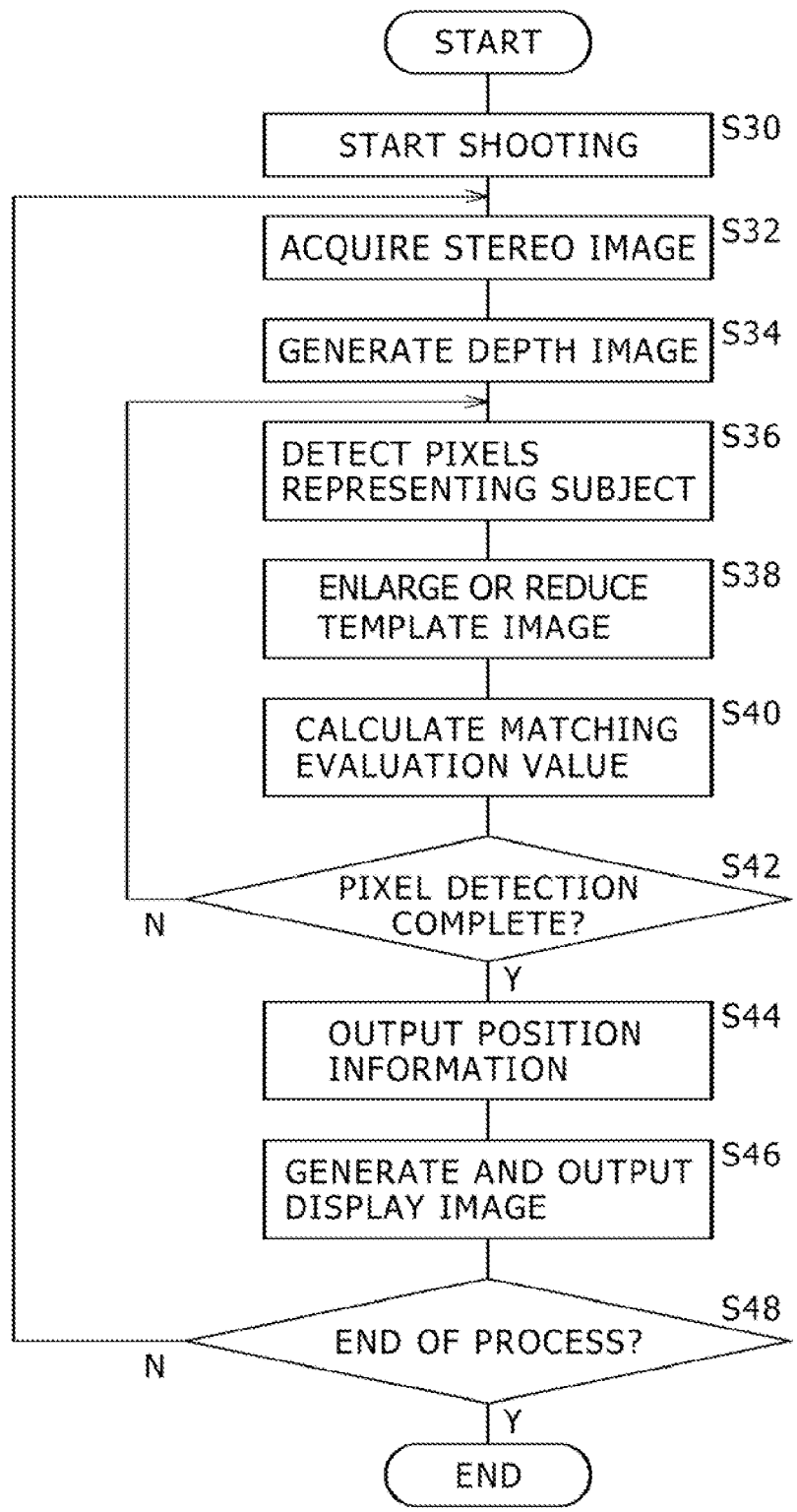
FIG. 9 is a flowchart showing the steps associated primarily with target position detection in the present embodiment.

A description will be given next of the operation of the information processor implemented by the configuration described above. FIG. 9 is a flowchart showing the steps associated primarily with target position detection of all information processing tasks performed by the information processing system 2. First, when the user instructs the input information acquisition section 44 to start the process, the imaging device 12 starts the shooting of a subject in response to a shooting start request via the image acquisition section 42 (S30). The image acquisition section 42 of the information processor 10 sequentially acquires frame data of the movie shot as described above and stores the data in the image storage section 48 (S32). This data includes stereo image data at a given rate.

Next, the depth image acquisition portion 52 of the position information generation section 46 generates a depth image using the stereo image data stored in the image storage section 48 (S34). The depth image has a distribution of subject distances in the depth direction as pixel values. If the imaging device 12 has a function to generate a depth image as described above, the depth image data is stored in the image storage section 48. Therefore, the depth image acquisition portion 52 reads the data rather than generating a depth image in S34. Next, the matching portion 54 of the position information generation section 46 scans the generated depth image, for example, in raster order, thus detecting the pixels whose values fall within a given range, i.e., the valid pixels representing the subject's picture (S36).

When the appropriate pixel is detected, the matching portion 54 enlarges or reduces the reference template image by the pixel value, i.e., the magnification factor appropriate to the distance in the depth direction (S38). Then, as shown in FIG. 7, the matching portion 54 arranges the template image on the depth image so that that pixel is located at the center of the template image, and calculates a matching evaluation value using each pixel and its corresponding pixel of the depth image as shown in formula 12 (S40). The processes from S36 to S40 are repeated until all the pixels of the depth image are scanned (N in S42, and S36, S38, and S40). This provides a distribution of matching evaluation values having a matching evaluation value associated with each of the pixels making up the subject's picture in the depth image.

The matching portion 54 outputs, as position information, either data representing the above distribution on the image plane or image data representing the picture area which is likely to be the target based on the data representing the distribution (Y in S42 and S44). The output information generation section 50 narrows down the target area based on information supplied from the position information generation section 46 first, and then performs tracking or other image analysis process appropriate to the application purpose, generating a display image representing the processing result as necessary and outputting the image (S46).

Until the user instructs that the processes be terminated, the processes from S32 to S46 are repeated. As a result, a movie or other image reflecting the target motion continues to be output (N in S48, and S32 to S46). All the processes are terminated in response to a termination instruction (Y in S48). It should be noted that the process in S46 may be performed at a rate separate from that for the position detection process from S32 to S44. For example, this rate may be similar to the frame rate of the movie shot with the imaging device 12.

Figure 10:
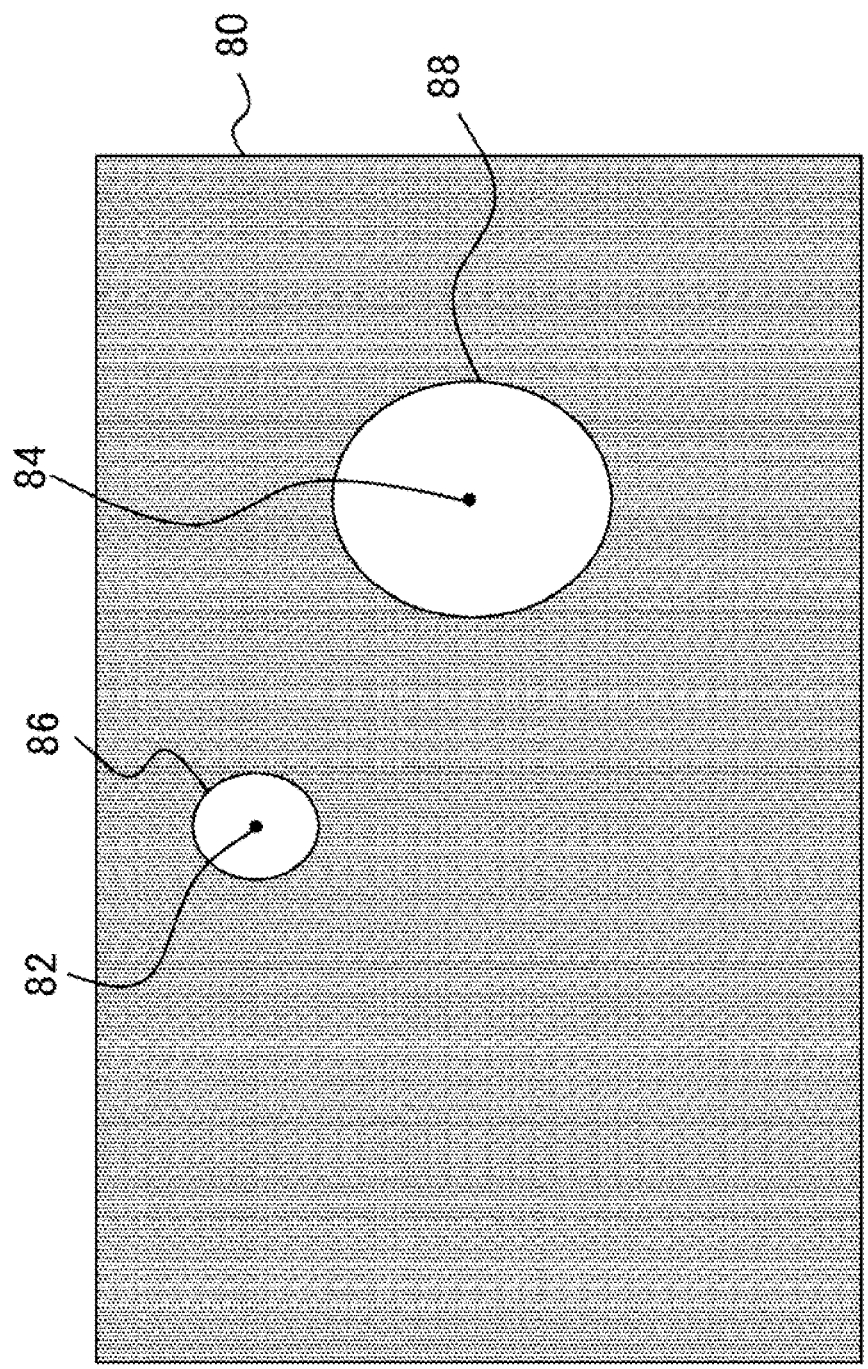
FIG. 10 is a diagram illustrating a data example of position information obtained in the present embodiment.

FIG. 10 illustrates a data example of position information obtained in S44. The matching portion 54 generates a matching evaluation value distribution having a matching evaluation value associated with each of the pixels in the depth image as described above. Then, the matching portion 54 extracts, from the distribution, points 82 and 84 whose matching evaluation values are maximal above a given threshold. Further, a template image is arranged so that each of the maximal points 82 and 84 is located at the center of the template image. These template images are obtained by enlarging or reducing the reference template image by the same magnification factor as used for adjusting the size during matching evaluation with the maximal points 82 and 84 at the center.

Then, the areas of the arranged template images corresponding to the target picture are represented in a manner distinguished from other areas. This provides an image 80 representing areas 86 and 88 respectively for the maximal points 82 and 84. The areas 86 and 88 are likely to be the pictures of the desired target. The example shown in FIG. 10 is an image obtained from the depth image 62 shown in FIG. 6. This image represents the areas likely to be a human head with a pixel value different from that for other area. It should be noted that the resolution of the image 80 output as position information is not specifically limited. However, the gap between pixels of a template image becomes larger as shown in FIG. 7 when the template image is enlarged. Therefore, the area 88 may be represented by interpolation as appropriate in accordance with the resolution of the image 80.

The output information generation section 50 performs processes required to eventually display an image using position information obtained as described above. For example, a face recognition process is performed on the areas 86 and 88 that are likely to be heads as described above. Alternatively, tracking is performed using the areas 86 and 88 as candidates. In this case, at least one of the spatial and temporal resolutions of the image to be processed may be adjusted in accordance with the processing accuracy required of these image analyses. For example, highly accurate image analysis results can be obtained by performing a process at the shooting frame rate using a high-resolution shot frame image. At this time, the area of the target picture on the image plane can be obtained by enlarging the image 80 generated as position information to the size of the high-resolution image subjected to image analysis.

The target position is narrowed down by using position information as shown in FIG. 10, thus providing improved efficiency in the image analysis process performed at a subsequent stage. Further, if the acquisition of position information is separated from the processes at subsequent stages and performed either at a lower resolution or frame rate, it is possible to reduce the processing load while maintaining the accuracy of final processing results. Further, in the present embodiment, the picture area of the target on the image plane is identified based on the distance of the target in the depth direction. As a result, this translates into the fact that the position of the target in the three-dimensional space is identified. Therefore, positional information of the target in the three-dimensional space may be output in S44 of FIG. 9.

That is, the matching portion 54 may output coordinates representing the target position on the image plane and that in the depth direction rather than generating the image 80 shown in FIG. 10 as position information. Here, the elements of the coordinates to be output are, for example, the coordinates of each of the pixels of the maximal points 82 and 84 of the matching evaluation values and the position coordinates in the depth direction corresponding to the pixel values of the pixels in the depth image. Alternatively, an image or its area information may be used as position information. Such an image represents areas that include the pixels of the maximal points and are made up of continuous pixels whose pixel values in the depth image fall within a given range from the pixel values of the maximal points. An area whose position in the depth direction falls within a given range is more specifically an area highly likely to represent one of the planes of the target. Therefore, the shape thereof is considered to reflect the actual shape of the target.

Therefore, if the matching portion 54 outputs such position information successively, the output information generation section 50 can perform processes in consideration of possible change in the target shape. It should be noted that these areas may be extracted from within an area in which the areas 86 and 88 are arranged or from within an area including the above area and spreading across a given range, irrespective of whether the pixels are continuous. On the other hand, the present embodiment is not limited to the condition that the pixel value of the depth image falls within a given range. Instead, a variety of conditions may be set for the pixel value of the depth image in accordance with the known target shape for extraction of an area. Further, depending on the process performed by the output information generation section 50, one of the varieties of position information described so far or a combination of two or more thereof may be selected as appropriate and output from the matching portion 54 or used by the output information generation section 50.

The technique described so far adjusts the size of the reference template image to match the picture size that is appropriate to the subject position in the depth direction. On the other hand, the larger the permissible range of the subject position in the depth direction, the larger the extent to which the apparent size thereof changes. In such a case, the closer the subject to the cameras, the larger the area size thereof. Therefore, as is obvious from the subject 64 shown in FIG. 7, the number of times a template image is arranged for a subject to calculate a matching evaluation value increases significantly. Further, the change in gap between pixels as a result of significant enlargement or reduction of a reference template image may affect the processing efficiency or evaluation accuracy.

Figure 11:
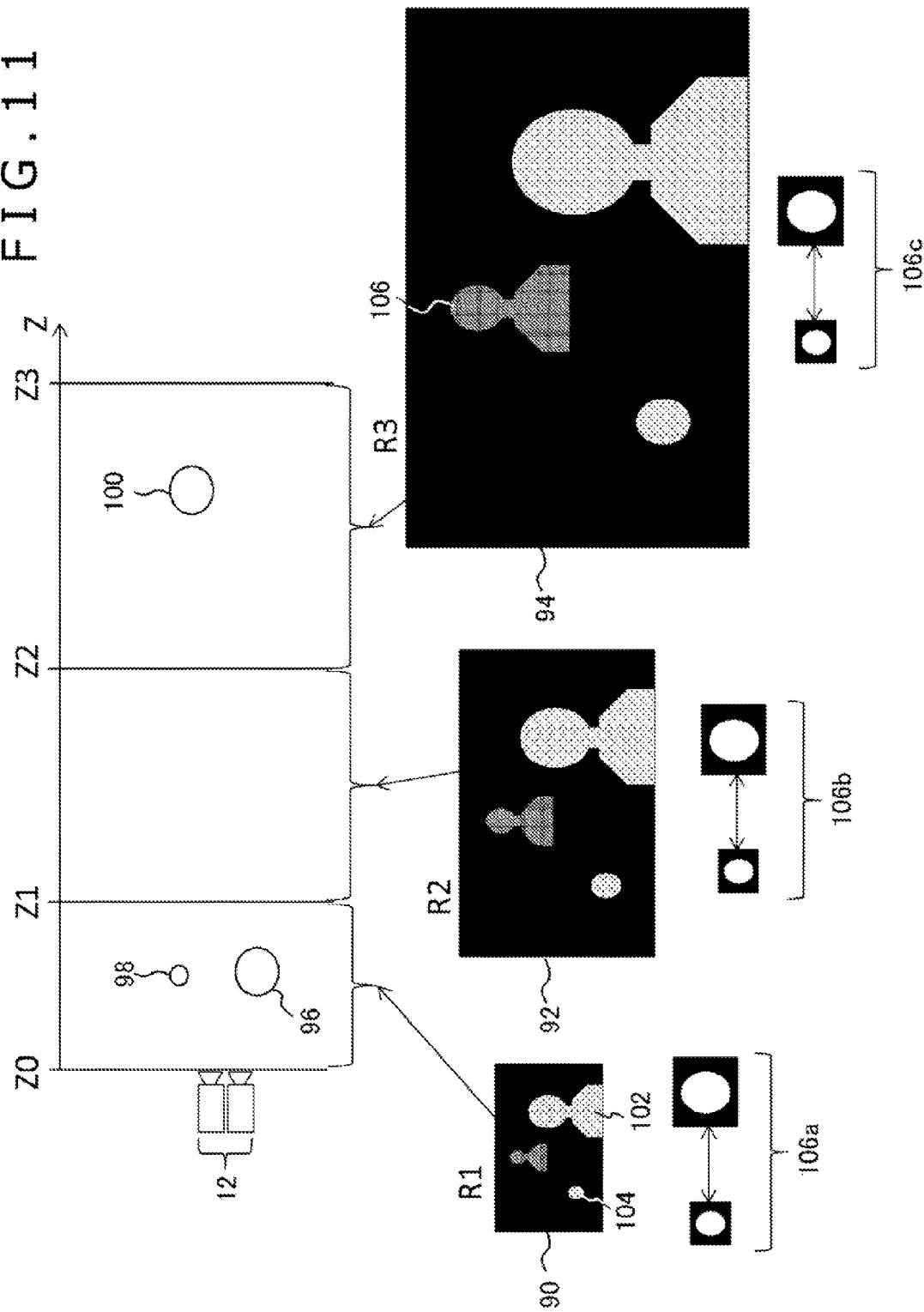
FIG. 11 is a diagram for describing a pattern matching technique using depth images represented with a plurality of resolutions in the present embodiment.

For this reason, the range of the magnification factor may be restricted by changing the resolution of the depth image itself during adjustment of the size of the reference template image. FIG. 11 is a diagram for describing a pattern matching technique using depth images represented with a plurality of resolutions. Depth images 90, 92, and 94 in FIG. 11 are represented, respectively, with different resolutions R1, R2, and R3 (R1<R2<R3). For example, the depth image acquisition portion 52 generates the depth image 94 having the highest resolution R3 by an ordinary technique, and then reduces the depth image 94 in two steps, thus generating the depth image 92 having the intermediate resolution R2 and the depth image 90 having the lowest resolution R1.

It should be noted that the highest resolution R3 may be the shooting resolution of the imaging device 12 or lower than that. The imaging device 12 may create the depth image 94 first, followed by the generation of the depth images 92 and 90 by the depth image acquisition portion 52 using the data of the depth image 94. The resolutions R1, R2, and R3 of the depth images to be generated are determined in advance and stored in the depth image acquisition portion 52. It should be noted that the number of resolutions is not limited to three and may be determined in consideration of the range of motion of the target, the actual size thereof, and so on.

Then, the matching portion 54 performs the process in S36 of FIG. 9, i.e., the process of detecting the pixel that represents the subject only in the range of the distance Z in the depth direction associated with each of the resolutions. The diagram at the top of FIG. 11 shows the ranges of the distance Z in the depth direction from the imaging device 12, each associated with one of the resolutions, together with a bird's eye view of the shooting space. In this example, the range in which the distance Z in the depth direction is such that $Z0 \leq Z < Z1$ is associated with the lowest resolution R1. The range in which the distance Z in the depth direction is such that $Z1 \leq Z < Z2$ is associated with the intermediate resolution R2. The range in which the distance Z is such that $Z2 \leq Z < Z3$ is associated with the highest resolution R3. Here, $Z0 \leq Z < Z3$ is associated with the valid range of subject position used in S36 of FIG. 9 in the above embodiment in which a depth image has only one resolution.

When pixels are detected which have pixel values falling within the above range in the depth image 90 having the lowest resolution R1, pixels in the areas of pictures 102 and 104 of subjects 96 and 98 are detected in the shooting space. When pixels are detected which have pixel values falling within the above range in the depth image 92 having the intermediate resolution R2, there is no subject in the appropriate range of the shooting space. Therefore, no pixels are detected. When pixels are detected which have pixel values falling within the above range in the depth image 94 having the highest resolution R3, pixels in the area of a picture 106 of a subject 100 are detected.

After the detection of pixels that are likely to be the pictures of the subjects, the adjustment of the reference template image size and the calculation of matching evaluation values are performed for each of the depth images in the same manner as S38 and S40 in the flowchart of FIG. 9. This provides a distribution of matching evaluation values for each depth image, and by extension, for each range of the associated distance. The matching portion 54 combines these distributions as necessary, thus generating position information as shown in FIG. 10.

As described above, the resolution of the depth image used for matching is changed according to the distance of the subject. That is, a depth image represented in a small size and having a low resolution is used at a short distance where the picture is large. On the other hand, a depth image represented in a large size and having a high resolution is used at a long distance where the picture is small. As a result, variation ranges 106a, 106b, and 106c of the size of the reference template image to be adjusted are limited irrespective of the subject position. It is preferred that the depth image resolutions and the corresponding ranges of distance should be selected so that the range of the magnification factor M of the template image is roughly the same for all the depth images. For example, the depth image resolutions and the corresponding ranges of distance should be determined so that the range of the magnification factor M is such that $\frac{1}{2} \leq M \leq 2$.

A case has been primarily described so far in which a human head position is detected using a single reference template image. Even if the orientation of the face is significantly different, the head shape does not change much. Therefore, pattern matching as described above allows to detect the head position, and by extension, the position of a person with ease even in a shooting space where a variety of objects exist. For this reason, other body region may be detected by the same processes after identifying the head position.

Figure 12:
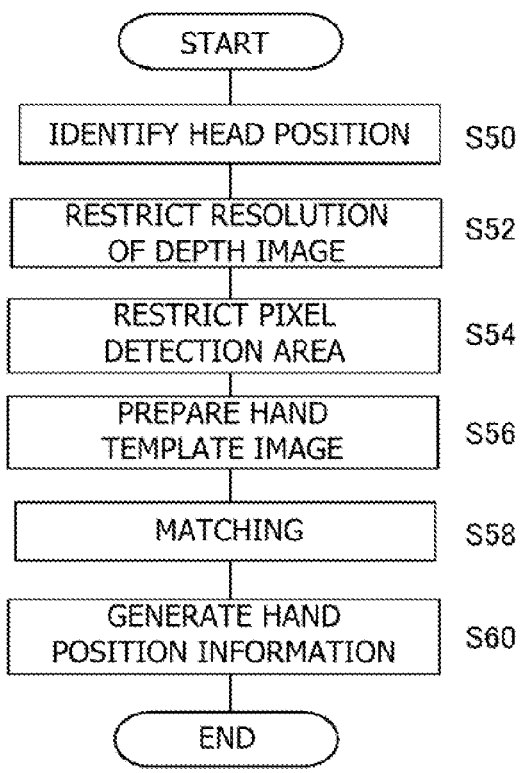
FIG. 12 is a flowchart showing the steps of detecting the positions of hands using a head position detection result in the present embodiment.

FIG. 12 is a flowchart showing the steps of detecting the positions of hands using the head position detection result in the information processing system 2. In order to perform this process, not only a reference template image of a head but also a reference template image of hands are prepared. So long as $\Delta x_{tmp}$ is set by estimating the approximate sizes of hands in the real space, a simple shape such as round may be used as the shape of each hand. Thus, by detecting an area that is likely to be hands as a whole picture, it is possible to prevent undetection caused by the fact that matching evaluation values are affected by the detailed change in the shape of the pictures of the hands as a result of bending or stretching thereof or the change in the orientations of the hands.

First, the position information generation section 46 detects the head position by going through the series of steps shown in FIG. 9 (S50). At this time, subject detection and matching may be performed on each of the depth images represented with a plurality of resolutions as illustrated in FIG. 11. Next, the matching portion 54 determines an area in which the hands are likely to be located based on the head position. More specifically, if depth images of a plurality of resolutions are available, the matching portion 54 restricts the resolution to be subjected to matching (S52), and further restricts the area in which to detect the pixel representing the subject (S54).

Then, the matching portion 54 performs template matching using the reference template image of hands rather than the reference template image of head (S56 and S58). This process is the same as that from S36 to S42 shown in FIG. 9. This provides a distribution of matching evaluation values for the reference template image of hands. Therefore, the matching portion 54 generates hand position information using the distribution in the same manner as it does head position information (S60).

Figure 13:
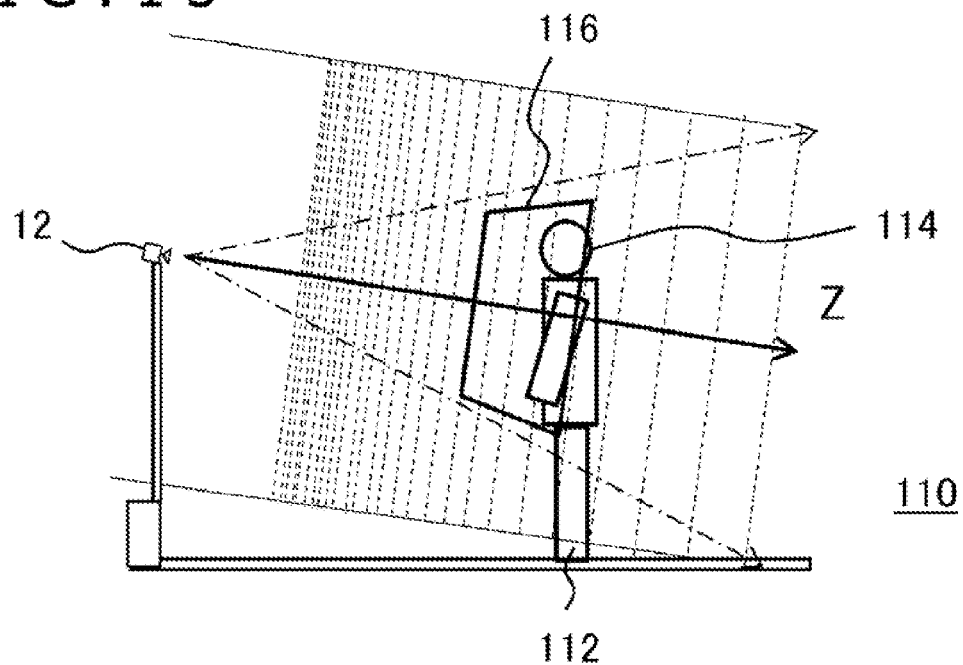
FIG. 13 illustrates the manner in which the target area for hand detection is restricted based on the head position in the present embodiment.

FIG. 13 schematically illustrates the manner in which the target area for hand detection is restricted based on the head position. We assume that, in a shooting space 110 including the imaging device 12 and a subject 112, a head 114 of the subject 112 has been detected by the process in S50 of FIG. 12. At this time, the range of motion of the hands can be restricted relative to the head position in the three-dimensional space. Therefore, this range of motion is determined as a detection area. In FIG. 13, an area 116 is set as a detection area for the head 114. It should be noted that although FIG. 13 shows only the side shape of the detection area 116, we assume that the detection area 116 is actually defined in the three-dimensional space.

Then, in S54 of FIG. 12, the matching portion 54 detects the pixels whose values fall within the range of the distance Z in the depth direction defined in the detection area 116 of all the pixels in the area of the image plane onto which the detection area 116 is projected. As a result, the pixels are detected which represent the subject existing in the detection area 116. If depth images with a plurality of resolutions are available, the matching portion 54 restricts the detection target to the depth image whose resolution is associated with the range of the distance Z in the depth direction defined in the detection area 116 in S52 of FIG. 12.

As described above, if the position of other body region is detected by using position information of the head, the range to be scanned becomes narrower, significantly reducing the processing load for matching. Further, narrowing down the area in which the hands are highly likely to be located ensures a lower possibility of erroneous detection of other subject of a similar shape in the image, thus contributing to improved detection accuracy. In this example, the hand position was efficiently identified using the relationship in relative position between the head and the hands. The head offers robustness, for example, to the change in the orientation of the face as described earlier, making the head suitable for identifying the positions of other body regions such as not only the hands but also the feet and the torso. On the other hand, the combination of targets for position detection is not specifically limited so long as a similar relationship is obtained.

In the embodiment described above, a depth image is generated using stereo images shot with the imaging device. The depth image represents the distance of a subject in the depth direction on the image plane. Then, the size of the reference template image of the target to be detected is adjusted based on the position of the subject in the depth direction represented by the depth image first. This is followed by template matching on the depth image, thus identifying the target from the subject and detecting the position thereof at the same time.

As a result, subjects having the same shape but not the same size are not detected. This allows for detection thanks to the restricted shape and size even if the target moves in the depth direction. Further, it is possible to perform the processes such as identifying the subject's picture and adjusting the size of the reference template image in accordance therewith in a wasteless and concentrated manner. This allows for more efficient detection of target position than template matching using an ordinary shot image.

If this matching process is performed at low temporal and spatial resolutions, and if image analyses such as face recognition and tracking are performed separately at high temporal and spatial resolutions after narrowing down to the picture area of the detected target, it is possible to reduce the processing load while maintaining the accuracy of final processing results. Further, doing so allows for identification of a candidate for target at its approximate shape and size even when the target is something whose shape changes at a detailed level such as hands, thus minimizing undetection.

Still further, depth images of a plurality of resolutions are prepared, and matching is performed only against subjects located in the ranges of the distance in the depth direction, each associated with the depth image with one of the resolutions. Qualitatively, the depth image at a low resolution is used for detection of the subjects at a short distance from the imaging device. The higher the resolution, the more the depth images are used for detection of the subjects at a long distance. This contributes to smaller variation ranges of the size of the pictures of the subjects. As a result, the change in size of the area in which the template image is to be moved for matching against the subjects is restricted irrespective of the positions of the subjects, thus contributing to steady processing load. Further, the range of size adjustment of the reference template image is restricted, thus providing matching evaluation values under the same conditions irrespective of the positions of the subjects.

Further, after the detection of the position of a target whose picture does not change its shape much such as human head by the above technique, other target whose positional relationship with the human head is known is detected by the same technique. At this time, the range of motion of the target to be detected later is restricted in a three-dimensional space with reference to the position of the target detected first, thus allowing only the subjects existing in that space to be subjected to matching. This allows for detection of a target having a variety of shapes with minimal processing load and with high accuracy.

The present invention has been described above based on an embodiment. It should be understood by those skilled in the art that the above embodiment is illustrative, that the combination of components and processes can be modified in various ways, and that such modification examples also fall within the scope of the present invention.

In the present embodiment, for example, a depth image is generated using stereo images. However, the method of generating a depth image is not limited thereto. Instead, for example, an infrared sensor, an infrared camera, or a camera adapted to irradiate a reference beam may be provided separately to obtain a subject position distribution in the depth direction by analyzing the reflection time of the infrared ray or the reference beam irradiated onto the subject or the infrared image, thus generating a depth image based on the position distribution. Alternatively, one of the techniques proposed to identify the position of a subject in the depth direction may be used. In any case, the subsequent matching process is the same as described in the present embodiment.

REFERENCE SIGNS LIST

2 Information processing system, 10 Information processor, 12 Imaging device, 16 Display device, 13a First camera, 13b Second camera, 22 CPU, 24 GPU, 26 Main memory, 42 Image acquisition section, 44 Input information acquisition section, 46 Position information generation section, 48 Image storage section, 50 Output information generation section, 52 Depth image acquisition portion, 54 Matching portion.

INDUSTRIAL APPLICABILITY

As described above, the present invention is applicable to computers, game consoles, information terminals, image processors, image display devices, and other information processors.

The invention claimed is:
1. An image processor for detecting a position of a given target of a subject shot with a camera, the image processor comprising:
a depth image acquisition portion adapted to acquire a depth image representing, on an image plane, a distance of the subject from the camera in a depth direction as a pixel value; and
a matching portion adapted to adjust a size of a template image prepared for the target in accordance with a position of the template image and the distance of the subject represented by the depth image in the depth direction, evaluate the matching of the picture of the subject based on the pixel value within an area corresponding to the template image on the depth image or the image shot with the camera, identify the picture of the subject, the target, based on the matching evaluation result, generate position information thereof, and output that information, wherein:
the depth image acquisition portion acquires depth images of a plurality of resolutions, and
the matching portion evaluates the matching of the subjects in each of the depth images of one of the resolutions by restricting the evaluation to the subjects existing within a range of the distance in the depth direction associated with one of the resolutions.

2. The image processor of claim 1, wherein the matching portion evaluates the matching in such a manner that, of all the ranges of the distance, the larger the distance in the depth direction, the higher the resolution of the depth image used for evaluation.

3. The image processor of claim 1, wherein the matching portion evaluates the matching based on feature points in the area of the image shot with the camera corresponding to the template image.

4. The image processor of claim 1, wherein the matching portion generates position information of a first target first, and then identifies by evaluating the matching of a second target whose range of motion relative to the first target is known by restricting the evaluation to the subjects existing in the area of the depth image or the image shot with the camera corresponding to the range of motion.

5. The image processor of claim 1, further comprising:
an output information generation section adapted to perform a given image analysis process on only an area of a target picture of the image shot with the camera using position information output from the matching portion so as to generate an output image to match the motion of the target, wherein
the depth image used for matching evaluation by the matching portion is lower in resolution than that subjected to the image analysis process by the output information generation section.

6. The image processor of claim 5, wherein the matching portion outputs target position information less frequently than the output information generation section generates the output image.

7. The image processor of claim 1, wherein
the matching portion adjusts a size of the template image by enlarging or reducing the template image both vertically and horizontally by a magnification factor $M = \Delta x_{tmp} / \Delta x_{at1} / Z$ (C is a constant)
where $\Delta x_{tmp}$ is a width represented by one pixel of the template image in a real space, $\Delta x_{at1}$ is a width represented by one pixel of the depth image in the real space, and Z is the distance of the subject represented by the depth image in the depth direction.

8. An image processing method for an image processor to detect a position of a given target of a subject shot with a camera, the image processing method comprising:
acquiring a depth image representing, on an image plane, a distance of the subject from a camera in a depth direction as a pixel value;
reading data of a template image prepared for the target from a memory;
adjusting a size of the template image in accordance with a position of the template image and the distance of the subject represented by the depth image in the depth direction and evaluating the matching of the picture of the subject based on the pixel value within an area corresponding to the template image on the depth image or the image shot with the camera; and
identifying the picture of the subject, the target, based on the matching evaluation result, generating position information thereof, and outputting that information, wherein:
the step of acquiring the depth images includes acquiring depth images of a plurality of resolutions, and
the step of adjusting the size includes evaluating the matching of the subjects in each of the depth images of one of the resolutions by restricting the evaluation to the subjects existing within a range of the distance in the depth direction associated with one of the resolutions.

9. A computer executing a computer program allowing the computer to detect a position of a given target of a subject shot with a camera, the computer program allowing the computer to perform:
acquiring a depth image representing, on an image plane, distances of subjects from a camera in a depth direction as pixel values;
reading data of a template image prepared for the target from a memory;
adjusting a size of the template image in accordance with a position of the template image and the distance of the subject represented by the depth image in the depth direction and evaluating the matching of the picture of the subject based on the pixel value within an area corresponding to the template image on the depth image or the image shot with the camera; and
identifying the picture of the subject, the target, based on the matching evaluation result, generating position information thereof, and outputting that information, wherein:
the step of acquiring the depth images includes acquiring depth images of a plurality of resolutions, and
the step of adjusting the size includes evaluating the matching of the subjects in each of the depth images of one of the resolutions by restricting the evaluation to the subjects existing within a range of the distance in the depth direction associated with one of the resolution.

10. A non-transitory, computer-readable recording media storing a computer program allowing a computer to detect a position of a given target of a subject shot with a camera, the computer program allowing the computer to perform:
acquiring a depth image representing, on an image plane, distances of subjects from a camera in a depth direction as pixel values;
reading data of a template image prepared for the target from a memory;
adjusting a size of the template image in accordance with a position of the template image and the distance of the subject represented by the depth image in the depth direction and evaluating the matching of the picture of the subject based on the pixel value within an area corresponding to the template image on the depth image or the image shot with the camera; and
identifying the picture of the subject, the target, based on the matching evaluation result, generating position information thereof, and outputting that information, wherein:
the step of acquiring the depth images includes acquiring depth images of a plurality of resolutions, and
the step of adjusting the size includes evaluating the matching of the subjects in each of the depth images of one of the resolutions by restricting the evaluation to the subjects existing within a range of the distance in the depth direction associated with one of the resolution.

* * * * *